United States Patent [19]
Huang

[11] 3,780,533
[45] Dec. 25, 1973

[54] COMPOSITE WALL FOR A REGENERATIVELY COOLED THRUST CHAMBER OF A LIQUID PROPELLANT ROCKET ENGINE

[75] Inventor: David H. Huang, Woodland Hills, Calif.

[73] Assignee: The United States of America as represented by the Secretary of the Air Force, Washington, D.C.

[22] Filed: May 17, 1972

[21] Appl. No.: 254,139

[52] U.S. Cl................................... 60/260, 165/169
[51] Int. Cl............................................. F02k 11/02
[58] Field of Search.................. 60/267, 260, 39–66, 60/271; 165/169

[56] References Cited
UNITED STATES PATENTS

| 3,692,637 | 9/1972 | Dederra et al. | 60/267 |
| 3,154,914 | 11/1964 | Stockel | 60/260 |
| 3,052,431 | 9/1962 | Compton | 60/271 |
| 3,690,103 | 9/1972 | Dederra et al. | 60/267 |
| 3,686,081 | 8/1972 | Butter et al. | 60/260 |

FOREIGN PATENTS OR APPLICATIONS

| 937,695 | 9/1963 | Great Britain | 60/260 |

Primary Examiner—Carlton R. Croyle
Assistant Examiner—Warren Olsen
Attorney—Harry A. Herbert, Jr. et al.

[57] ABSTRACT

A composite wall, and a method of manufacturing it, for a regeneratively cooled thrust chamber of a liquid propellant rocket engine. The composite wall of the thrust chamber comprises: an outer wall component of high strength lightweight alloy; a middle wall component of nickel abutting with and joined to the outer wall component, with the middle wall having a plurality of lands thereon and a plurality of grooves therein; and, an inner wall component of material of high thermal conductivity and high temperature strength and ductility, with the inner wall component abutting with and joined to the lands on the middle wall component, thereby forming liquid propellant coolant passages of the channel type. The outer wall component, the middle wall component, and the inner wall component are integrated to form a unitary structure. The external surface of the outer wall component functions as the external structural shell surface of the thrust chamber, and the internal surface of the inner wall component functions as the internal combustion gas side surface of the thrust chamber. The inner wall component may be conveniently, easily, and economically replaced after its normal operational life.

4 Claims, 9 Drawing Figures

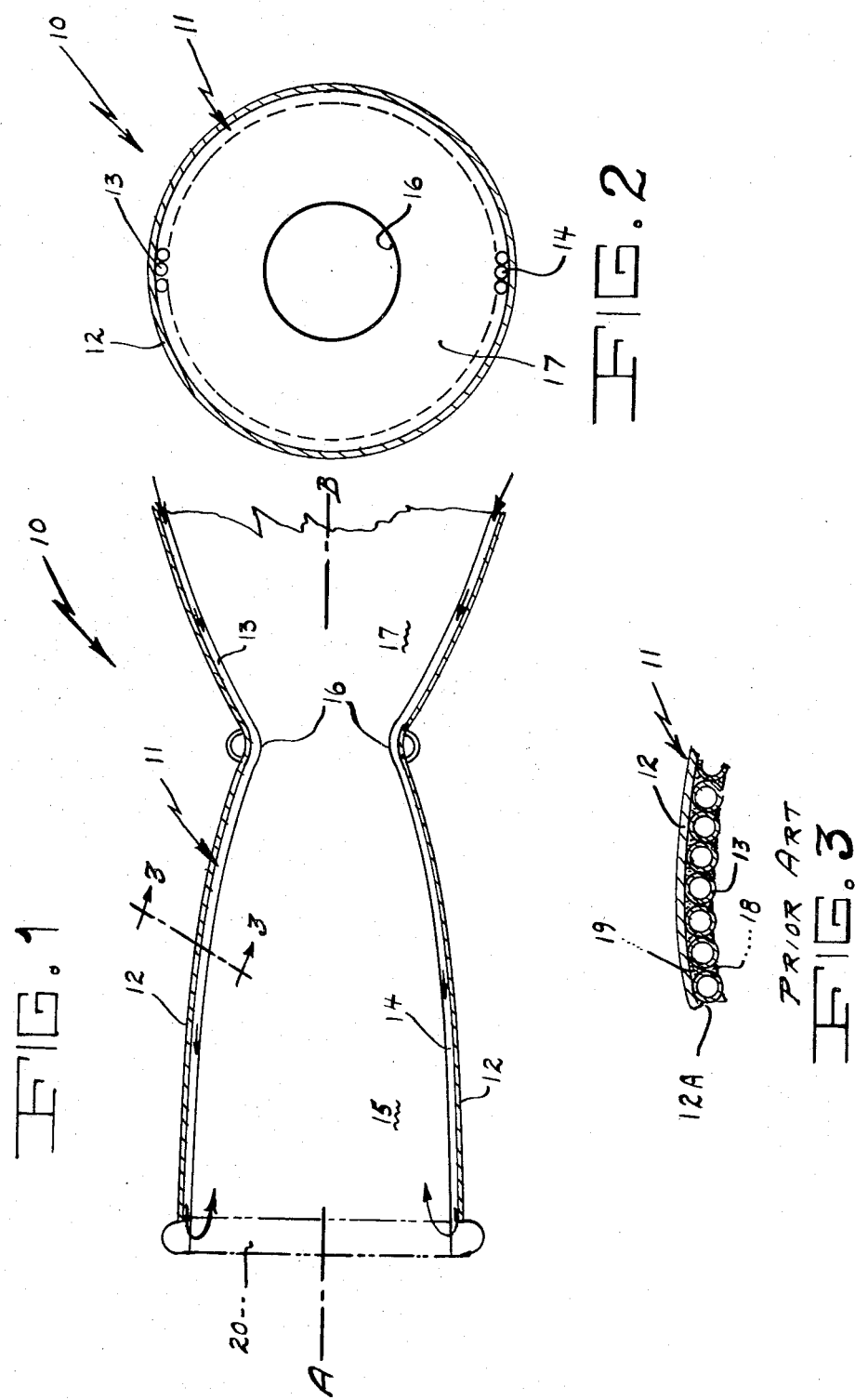

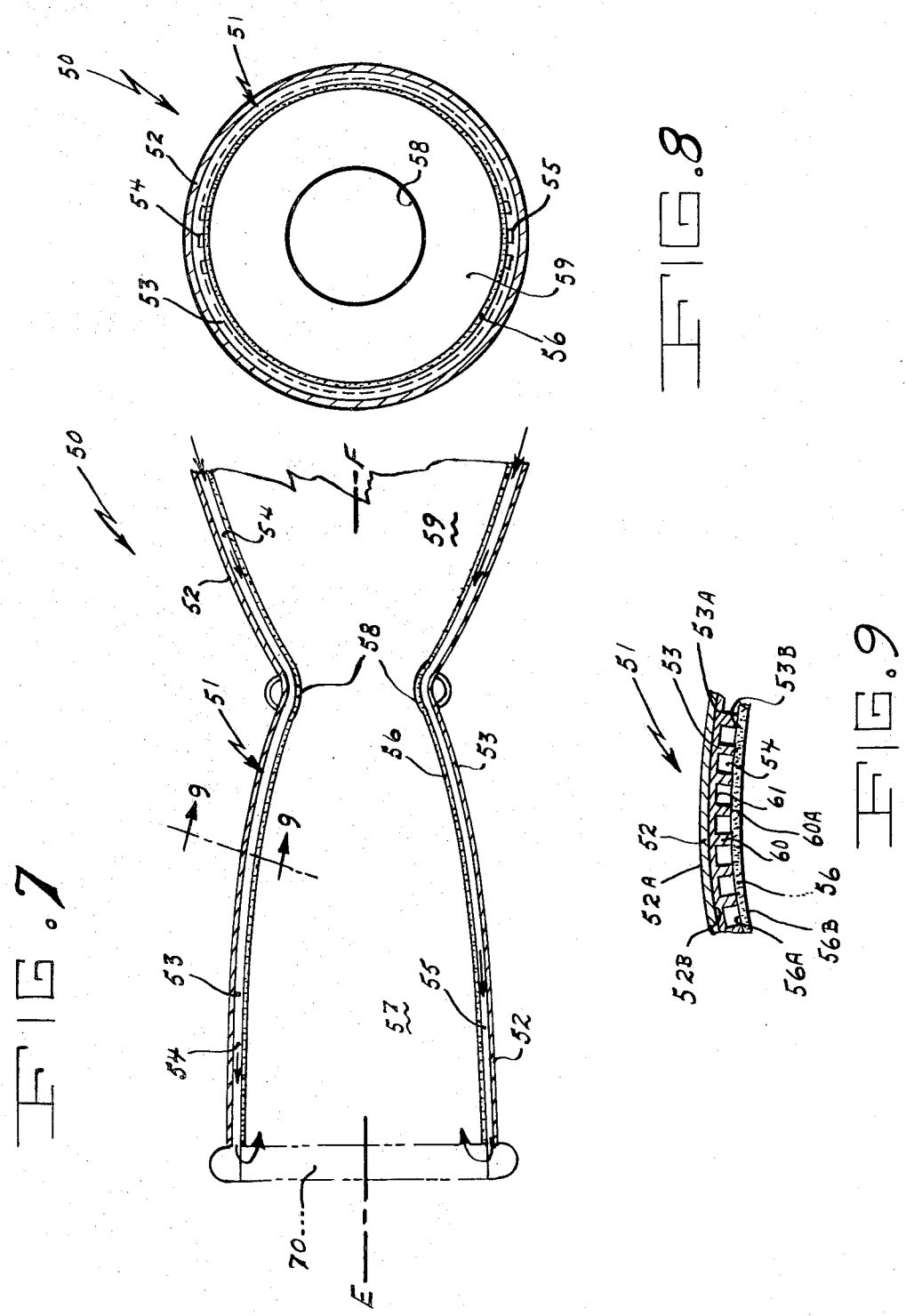

COMPOSITE WALL FOR A REGENERATIVELY COOLED THRUST CHAMBER OF A LIQUID PROPELLANT ROCKET ENGINE

BACKGROUND OF THE INVENTION

This invention relates to a liquid propellant rocket engine and, more particularly, to a regeneratively cooled thrust chamber thereof.

Because of the high combustion gas temperature (e.g., up to 8,000° F) and the high heat transfer rates to the thrust chamber wall (e.g., up to 100 BTU/in$^2$-sec), the cooling capacity of the rocket engine thrust chamber becomes a major factor in obtaining maximum rocket engine performance. Regenerative cooling is the most widely applied cooling method for liquid propellant rocket engines, especially of the high performance type. By the use of this method, one or both of the liquid propellants are utilized for cooling the thrust chamber by feeding the propellants through coolant passages in the thrust chamber wall, before the liquid propellants are injected into the combustion chamber portion of the thrust chamber.

There are two well-known and widely used prior art types of walls for a regeneratively cooled thrust chamber of a liquid propellant rocket engine. Each type will be described and discussed later herein. However, it is important to note at this time that neither type satisfies the stringent heat requirements of a liquid propellant rocket engine, particularly of the high performance type, and that neither type can be easily fabricated at a relatively low cost, and that neither type permits the practical refurbishing of the thrust chamber wall or, more accurately, of the combustion gas side surface of the wall after its normal operational life cycle.

My novel composite wall for a regeneratively cooled thrust chamber of a liquid propellant rocket engine eliminates these disadvantages and obviates these inabilities and, thereby, significantly advances the state-of-the-art.

SUMMARY OF THE INVENTION

This invention pertains to a regeneratively cooled thrust chamber of a liquid propellant rocket engine and, more specifically, to the structure of the wall of the thrust chamber and to a method of manufacturing said wall.

Accordingly, the principal object of this invention is to provide a novel regeneratively cooled thrust chamber wall for use in a liquid propellant rocket engine, especially of the high performance type, whereby said wall will satisfy the stringent heat transfer requirements imposed upon it during use of the rocket engine.

Obviously, an equally important object is to provide a method of manufacturing said novel regeneratively cooled thrust chamber wall, whereby said wall may be easily fabricated at a relatively low cost.

Another equally important object of this invention is to provide a practical method of refurbishing the thrust chamber wall (or, more accurately, the combustion gas side surface of the wall) after its normal operational life cycle.

These objects, and other equally important and related objects, of this invention will become readily apparent after a consideration of the description of my novel thrust chamber wall, and of the inventive method of manufacturing it, coupled with reference to the drawings.

DESCRIPTION OF THE DRAWINGS

FIG. 1 is a side elevation view in simplified schematic form, partially in cross-section and partially fragmented, of a conventionally configurated regeneratively cooled thrust chamber of a liquid propellant rocket engine;

FIG. 2 is an end elevation view, in simplified schematic form, of the fragmented thrust chamber shown in FIG. 1;

FIG. 3 is a vertical cross-section, in simplified schematic form, enlarged and in detail, of that portion of the thrust chamber wall taken along line 3—3 of FIG. 1, showing the structure of one of the two types of prior art thrust chamber walls;

FIG. 7 is a side elevation view in simplified schematic form, partially in cross-section and partially fragmented, of a conventionally externally configurated regeneratively cooled thrust chamber of a liquid propellant rocket engine which incorporates my inventive concepts;

FIG. 8 is an end elevation view, in simplified schematic form and in cross-section, of the fragmented thrust chamber shown in FIG. 7; and FIG. 9 is a vertical cross-section, in simplified schematic form, enlarged and in detail, of that portion of the thrust chamber taken along line 9—9 of FIG. 7, showing the structure of a preferred embodiment of my inventive thrust chamber wall.

DESCRIPTION OF, AND MODE OF OPERATION OF, THE PRIOR ART STRUCTURES AND OF THE PREFERRED EMBODIMENT

As has been previously stated herein, there are two wellknown and widely used prior art types of walls for a regeneratively cooled thrust chamber of a liquid propellant rocket engine. The type of wall is classified, as a matter of convenience, in accordance with the two types of liquid propellant coolant passages used in, or with, the wall to regeneratively cool the thrust chamber involved. The types of walls, therefore, are referred to in the art, and are in fact, the tube type (or more specifically, the metal tube type) and the channel type.

Figure 6:
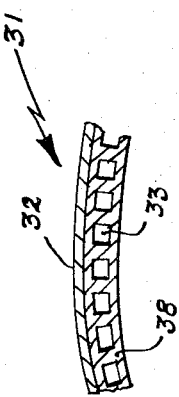
FIG. 6 is a vertical cross-section, in simplified schematic form, enlarged and in detail, of that portion of the thrust chamber wall taken along line 6—6 of FIG. 4, showing the structure of the other of the two types of prior art thrust chamber walls.

With reference to FIG. 3, therein is shown, in simplified schematic form and in cross-section, the structure of the tube type of prior art wall for a regeneratively cooled thrust chamber of a liquid propellant rocket engine. With reference to FIG. 6, therein is shown, in simplified schematic form and in cross-section, the structure of the channel type of prior art wall for a regeneratively cooled thrust chamber of a liquid propellant rocket engine. FIGS. 3 and 6, and the tube type and channel type of prior art walls, will be discussed in detail later herein.

With reference to FIG. 1, therein is shown, in side elevation view and in simplified schematic form, partially in cross-section and partially fragmented, a conventionally configured regeneratively cooled thrust chamber 10 of a liquid propellant rocket engine. Also shown are longitudinal axis A–B of thrust chamber 10, and injector 20. Thrust chamber 10 includes, as shown in FIG. 1, composite wall (or wall assembly) 11, combustion chamber 15, throat 16, and nozzle 17. Composite wall 11 includes structural shell component 12, and a plurality of liquid propellant cooling passages, such as 13 and 14. The passages, such as 13 and 14, are tubes, and they run axially from a liquid coolant manifold (not shown) at the end of nozzle 17 to the injector 20. The direction of flow of the liquid propellant coolant within the coolant tubes, such as 13 and 14, is as indicated in FIG. 1 by the arrows (i.e., from the reader's right to the reader's left). Thrust chamber wall 11 is cooled by flowing the liquid propellant through the coolant tubes, such as 13 and 14.

With regard to FIG. 2, therein is shown an end elevation view, in simplified schematic form and in cross-section, of the fragmented thrust chamber 10 shown in FIG. 1. In FIG. 2 are shown thrust chamber composite wall (or wall assembly) 11 with structural shell component 12 and representative liquid propellant coolant tubes 13 and 14, thrust chamber throat 16, and thrust chamber nozzle 17. All of the plurality of liquid propellant coolant tubes are not shown, in the interest of maintaining simplicity of FIG. 2, but are represented by coolant tubes 13 and 14.

With reference to FIG. 3, therein is shown, in vertical cross-section and in simplified schematic form, enlarged and in detail, that portion of the thrust chamber wall 11 taken along line 3—3 of FIG. 1, depicting the tube type of wall 11 used in regeneratively cooled thrust chamber 10. As can be seen in FIG. 3, this type of prior art wall 11 comprises essentially a thrust chamber metal structural shell component 12, and a plurality of thin wall metal tubes, such as 13. The tubes, such as 13, are conventionally adjacent to each other, are aligned with each other, and are joined to each other and to the internal surface 12A of structural shell component 12 usually by brazing at all joints, such as joints 18 and 19. The liquid propellant coolant flows through the tubes, such as 13, thereby cooling wall 11 as a whole during operation of the thrust chamber 10.

Although this approach (i.e., the use of tubes as coolant passages) to the regenerative cooling of a thrust chamber of a liquid propellant rocket engine may appear to be satisfactory to those persons not of the art, it is well known by persons of ordinary skill in the art that the tube type wall approach to regenerative cooling poses many problems, such as in the attainable cooling capacity, passage size limitation, material selection, and in fabrication processes. This approach has been used, but only reluctantly and only because of absence of any other choice.

The regeneratively cooled thrust chamber wall art advanced with the conception and use of the channel type liquid propellant coolant passages. This other type of prior art wall for a regeneratively cooled thrust chamber is depicted in various views in FIGS. 4, 5 and 6.

Figure 4:
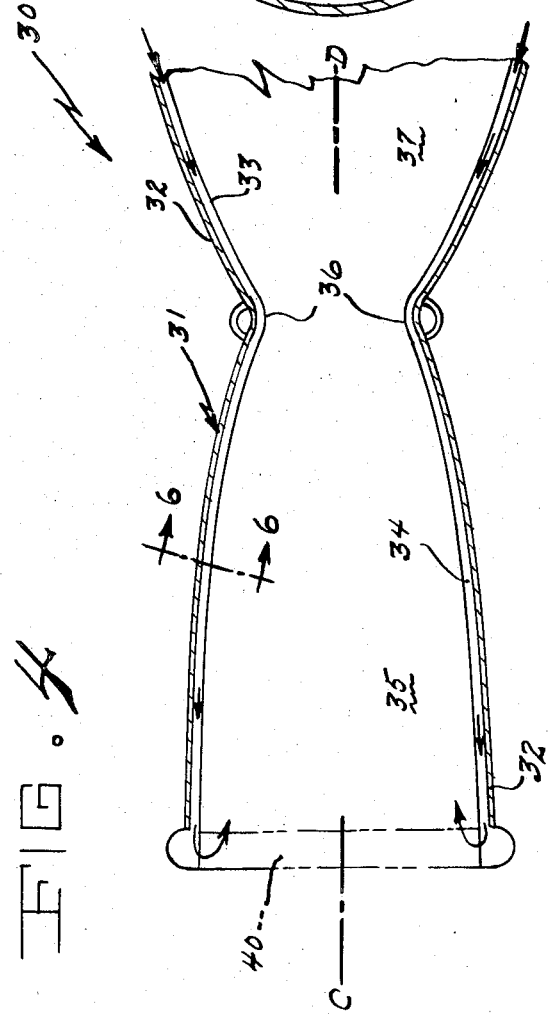
FIG. 4 is a side elevation view in simplified schematic form, partially in cross-section and partially fragmented, of a conventionally configurated regeneratively cooled thrust chamber of a liquid propellant rocket engine.

With reference to FIG. 4, therein is shown, in side elevation view and in simplified schematic form, partially in cross-section and partially fragmented, a conventionally configured regeneratively cooled thrust chamber 30 of a liquid propellant rocket engine. Also shown are longitudinal axis C–D of thrust chamber 30, and injector 40. Thrust chamber 40 includes, as shown in FIG. 4, composite wall (or wall assembly) 31, combustion chamber 35, throat 36, and nozzle 37. Composite wall 31 includes structural shell component 32, and a plurality of liquid coolant passages, such as 33 and 34. The passages, such as 33 and 34, are channels, the vertical cross-section of which is conventionally a rectangle, and the channels run and extend axially from a liquid coolant manifold (not shown) at the end of nozzle 37 to the injector 40. The direction of flow of the liquid propellant coolant within the coolant channels, such as 33 and 34, is as indicated in FIG. 4 by the arrows (i.e., from the reader's right to the reader's left). Thrust chamber wall 31 is cooled by flowing the liquid propellant through the plurality of coolant channels, such as 33 and 34.

Figure 5:
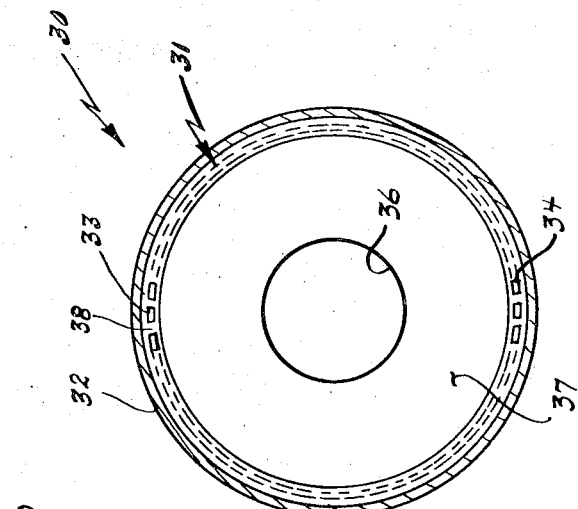
FIG. 5 is an end elevation view, in simplified schematic form and in cross-section, of the fragmented thrust chamber shown in FIG. 4.

With regard to FIG. 5, therein is shown an end elevation view, in simplified schematic form and in cross-section, of the fragmented thrust chamber 30 shown in FIG. 4. In FIG. 5 is shown thrust chamber composite wall (or wall assembly) 31 with structural shell component 32, and representative liquid propellant coolant channels 33 and 34 which are wholly within inner wall component 38. Also shown are thrust chamber throat 36 and thrust chamber nozzle 37. All of the plurality of liquid propellant coolant channels are not shown, in the interest of maintaining simplicity of FIG. 5, but are represented by coolant channels 33 and 34.

With reference to FIG. 6, therein is shown, in vertical cross-section and in simplified schematic form, enlarged and in detail, that portion of the thrust chamber wall 31 taken along line 6—6 of FIG. 4, depicting the channel type of wall 31 used in regeneratively cooled thrust chamber 30. As can be seen in FIG. 6, this type of prior art wall 31 comprises essentially a thrust chamber metal outer structural shell component 32, and an inner wall component 38 having therein a plurality of channels, such as 33. Inner wall component 38 abuts with, and is joined to, outer structural shell component 32. The channels, such as 33, conventionally are rectangular in vertical cross-section, are side-by-side, and are spaced equally or regularly. The liquid propellant coolant flows through the channels, such as 33, thereby cooling wall 31 as a whole during operation of the thrust chamber 30.

The use of this approach (i.e., the use of channels as coolant passages), as compared to the use of tubes as coolant passages, results in improved thrust chamber wall cooling and in overall improvement in performance of the liquid propellant rocket engine concerned. These improvements are achieved by the potential combustion gas side surface area reduction of the channel wall of up to 25 percent, flexibility in channel size and shape, and the two-dimensional heat transfer effect between channels. However, as is well known by persons of ordinary skill in the art, performance of this channel type wall depends to a large extent on the channel size and wall thickness control, combustion gas side wall material properties, and the channel interface with the outer structural shell component 32. As a result, in particular situations the results attained are neither the expected ones, nor the desired ones. For example, the interface bonding between the outer structural shell component 32 and the inner wall component 38 having channels, such as 33, therein, may prove to be unreliable.

Although both types of prior art walls for regeneratively cooled thrust chambers are used, both types are minimally satisfactory, and neither type satisfies the stringent heat requirements of a high performance type of liquid propellant rocket engine which requires a thrust chamber wall which permits high heat transfer and a high working temperature. In addition, neither prior art type of thrust chamber wall can be easily fabricated at a relatively low cost, and neither type permits the practical refurbishing of the thrust chamber wall or, more specifically of the combustion gas side surface of the wall after the normal operational life cycle of that side surface of the wall.

My novel composite wall for a regeneratively cooled thrust chamber of a liquid propellant rocket engine permits the attainment of the above-mentioned desired results. My novel wall is depicted in various views in FIGS. 7, 8 and 9.

With reference to FIG. 7, therein is shown, in side elevation view and in simplified schematic form, partially in cross-section and partially fragmented, a conventionally configurated regeneratively cooled thrust chamber 50 of a liquid propellant rocket engine, wherein thrust chamber 50 embodies my novel composite wall (or wall assembly) 51. Also shown are longitudinal axis E–F of thrust chamber 50, and injector 70. Thrust chamber 50 includes, as shown in FIG. 7, my composite wall (or wall assembly) 51, combustion chamber 57, throat 58, and nozzle 59. My composite wall includes outer wall component 52, a middle wall component 53 with a plurality of channel type liquid coolant passages therein, such as 54 and 55, and inner wall component 56. The channel type coolant passages, such as 54 and 55, are of rectangular vertical cross-section and run and extend axially from a liquid coolant manifold (not shown) at the end of nozzle 59 to the injector 70. The direction of flow of the liquid propellant coolant within the coolant channels, such as 54 and 55, is as indicated in FIG. 7 by the arrows (i.e., from the reader's right to the reader's left). Thrust chamber wall 51 is cooled by flowing the liquid propellant coolant through the plurality of coolant channels, such as 54 and 55.

With regard to FIG. 8, therein is shown an end elevation view, in simplified schematic form and in cross-section, of the fragmented thrust chamber 50 shown in FIG. 7. In FIG. 8 is shown my thrust chamber composite wall (or wall assembly) 51 which includes outer wall component 52, middle wall component 53 with a plurality of channel type liquid propellant coolant passages, such as representative ones 54 and 55, and inner wall component 56. Also shown are thrust chamber throat 58 and thrust chamber nozzle 59. All of the plurality of liquid propellant coolant channels are not shown, in the interest of maintaining simplicity of FIG. 8, but are represented, as stated above, by coolant channels 54 and 55.

With reference to FIG. 9, therein is shown, in vertical cross-section and in simplified schematic form, enlarged and in detail, that portion of my thrust chamber wall 51 taken along line 9—9 of FIG. 7, depicting my composite channel type wall 51 used in regeneratively cooled thrust chamber 50. As can be seen in FIG. 9, my novel composite wall comprises essentially: outer wall component 52 with external surface 52A and with internal surface 52B; middle wall component 53 with external surface 53A and with internal surface 53B, and with said middle wall component having therein portions of a plurality of channel type liquid propellant coolant passages, such as represented by channel type coolant passage 54; and inner wall component 56 with external surface 56A and with internal surface 56B.

Still with reference to FIG. 9, the outer wall component 52 of my composite wall 51 is made of suitable material, such as high strength lightweight alloy, and external surface 52A of outer wall component 52 functions as the external surface of composite wall 51 and defines the external structural shell surface of thrust chamber 50. Middle wall component 53 is made of suitable material, preferably nickel, and the external surface 53A of middle wall component 53 abuts with and is joined to the internal surface 52B of outer wall component 52. Middle wall component 53 has, at its internal surface 53B, a plurality of lands, such as represented by 60, thereon and has, at its internal surface 53, a plurality of grooves, such as represented by 61, therein. The plurality of lands, such as 60, are, but need not be, of equal size, equally spaced from each other, and side-by-side. The plurality of grooves, such as 61, are, but need not be, of equal size, equally spaced from each other, and side-by-side. It is preferred that, if the middle wall component 53 is to be of nickel, the component 53 be an electroformed nickel substrate and that the grooves, such as 61, be formed by machining.

Further with reference to FIG. 9, the inner wall component 56 is made of suitable material, such as nickel which is deposited by the electroform process, or if said inner wall component 56 is to be in sheet form, a great variety of materials may be used, including but not limited to nickel or refractory alloys, such as copper-silver alloy or molybdenum-rhenium alloy, and the like. Whatever material is used, said material should have high thermal conductivity, high temperature strength, and ductility. Again with reference to inner wall component 56, the external surface 56A of said component 56 abuts with and is joined to the internal surface 53B of middle wall component 53 and, more specifically, to the bottom, such as 60A, of each of the plurality of lands, such as 60, which are on the internal surface 53B of middle wall component 53. Thereby, liquid coolant passages of the channel type, such as 54 are formed. The internal surface 56B of inner wall component 56 functions as the internal surface of the composite wall 51 and defines the internal combustion gas side surface of thrust chamber 50. As may be easily seen, my composite wall 51 is cooled by flowing the liquid propellant coolant through the plurality of channel type coolant passages, such as 54.

If inner wall component 56 is of sheet form, the mechanical properties of the selected sheet can be treated and controlled to a great extent for good consistency and high durability. Furthermore, the thickness and surface finish of the sheet can also be controlled accurately at a relatively low cost. In addition, since the life cycles of thrust chamber operation are mainly limited by the fatigue failures of the combustion gas side wall, such as inner wall component 56 and internal surface 56B thereof, the use of a sheet as inner wall component 56 permits the selection of a sheet which will render best material properties and minimum stress concentrations and, therefore, will result in long operational life. Also, after the sheet-formed inner wall component 56 has gone through its normal operational life cycle, it may be replaced. This can be easily accomplished by machining off the old sheet, such as 56 (which I prefer be joined by brazing to the lands, such as 60, on middle wall component 53), and replacing it with a new sheet and joining or securing the new sheet to the lands of middle wall component 33, preferably by brazing.

In view of all of the foregoing, it is clear to any person of ordinary skill in the art that my composite wall, with its channel type coolant passages, for a regeneratively cooled thrust chamber of a liquid propellant liquid rocket is far superior to the prior art types of walls for regeneratively cooled thrust chambers, is and would have been unobvious to said person of ordinary skill, and significantly advances the state-of-the-art.

DESCRIPTION OF MY INVENTIVE METHOD

With regard to my inventive method of manufacturing a novel composite wall for a regeneratively cooled thrust chamber of a liquid propellant rocket engine, with said composite wall having therein liquid propellant cooling passages of the channel type, the method comprises essentially six steps which, in part, already have been inferentially set out above. Further, with regard to FIGS. 7, 8 and 9, said Figures incorporate the results of some of the steps of my inventive method.

As a preliminary matter, it is to be noted that my composite wall, such as 51, has an external surface, such as 52A, and an internal surface, such as 56B; and, the thrust chamber involved, such as 50, has an external structural shell surface defined by external surface 52A of my composite wall 51, and has an internal combustion gas side surface defined by internal surface 56B of my composite wall 51.

My novel method comprises, essentially, the following steps.

Firstly, I form an outer wall component, such as 52, of high strength lightweight alloy, with said outer wall component having an external surface, such as 52A, and an internal surface, such as 52B, and with external surface 52A functioning as the external surface of the composite wall, such as 51, and defining the external structural shell surface of the thrust chamber 50.

Then, I form a middle wall component, such as 53, preferably of nickel, and preferably by the low cost procedure of electroforming a nickel substrate. The middle wall component 53 is formed having an external surface, such as 53A, which is shaped to mate with the internal surface 52B of the outer wall component 52, and is formed having an internal surface 53B.

Next, I mate and join the middle wall component 53 to the outer wall component 52, with the external surface 53A of the middle wall component 53 abutting the internal surface 52B of the outer wall component 52. Of course, if the middle wall component 53 is formed by electroforming a nickel substrate, the middle wall-to-outer wall interface, and the joining thereof, is by electroformed bond.

Then, I form a plurality of grooves, such as 61, by suitable means, such as machining, in the internal surface 53B of the middle wall component 53, thereby forming lands, such as 60, on the internal surface 53B of the middle wall component 53, between the grooves.

Next, I form an inner wall component, such as 56, preferably by nickel deposition through the electroform process. However, inner wall component 56 may be formed by a preformed sheet of suitable material, such as nickel or a refractory alloy, such as copper-silver alloy or molybdenum-rhenium alloy, or the like. Whether by nickel deposition or the use of a preformed sheet, inner wall component 56 is formed of material of high thermal conductivity, high temperature strength, and ductility, and has an external surface, such as 56A, shaped to mate with the internal surface 53B which the middle wall component 53 had prior to the formation of the plurality of grooves, such as 61, therein. The internal surface 56B of inner wall component 56 functions as the internal surface of composite wall 51 and defines the internal combustion side surface of the thrust chamber 50.

Then, I mate and join the inner wall component 56 to the middle wall component 53, with the external surface 56A of the inner wall component 56 abutting the lands, such as 60, formed on the internal surface 53B of the middle wall component 53, whereby liquid propellant coolant passages of the channel type, such as 54, are formed. If the inner wall component 56 is a preformed sheet, the inner wall-to-middle wall joining is accomplished preferably by brazing. Further, if the inner wall component 56 is a preformed sheet, it may be removed and replaced easily and conveniently, as discussed above in connection with the description of a preferred embodiment of my invention.

After my preferred embodiment of the composite wall for a regeneratively cooled thrust chamber is manufactured by my inventive method, as set out above, the composite wall operates in, and is operated in, the same manner as any of the conventional prior art regeneratively cooled thrust chamber walls. In other words, my thrust chamber composite wall 51 is cooled by flowing the liquid propellant through the plurality of coolant passages of the channel type, such as 54 and 55, which are defined by the plurality of grooves, such as 61, and the external surface 56A of inner wall component 56. However, the performance of, and the results obtained by the use of my composite thrust chamber wall 51 are new, useful, unexpected, and unobvious. For example, my composite wall 51, unlike the prior art walls, satisfies the stringent heat requirements of a high performance type of liquid propellant rocket engine which requires a thrust chamber wall which permits high heat transfer and a high working temperature; permits the facile fabrication of the wall at a relatively low cost; and also permits the convenient replacement of the combustion side surface of the wall (i.e., inner wall component 56), with resultant economy of operation of the thrust chamber and of the rocket engine as a whole.

While there have been shown and described the fundamental features of my invention, as applied to a preferred embodiment and as set forth in an inventive method, it is to be understood that various substitutions, omissions, and adaptations may be made by those of ordinary skill in the art without departing from the spirit of the invention. For example, various changes may be made in shape, size, and arrangement of parts for other applications, such as nuclear reactors, chemical lasers, and the like. Additionally, and more generally, my invention may be adapted for use in cooling any conduit.

What I claim is:

1. A composite wall for a regeneratively cooled thrust chamber of a liquid propellant rocket engine, with said composite wall having therein liquid propellant coolant passages of the channel type, and with said composite wall having an external surface and an internal surface, and with said thrust chamber having an external structural shell surface defined by said external surface of said composite wall, and with said thrust chamber having an internal combustion gas side surface defined by said internal surface of said composite wall, and wherein said composite wall comprises:

a. an outer wall component of high strength lightweight alloy, with said outer wall component having an external surface and an internal surface, and with said external surface functioning as the external surface of the composite wall and defining the external structural shell surface of said thrust chamber;

b. a middle wall component of nickel, with said middle wall component having an external surface and an internal surface, and with said external surface of said middle wall component abutting with and joined to the internal surface of said outer wall component, and with the internal surface of said middle wall component having a plurality of lands thereon and a plurality of grooves therein;

c. and, an inner wall component of material of high thermal conductivity and high temperature strength and ductility, and with said inner wall component having an external surface and an internal surface, and with said external surface of said inner wall component abutting with and joined to the internal surface of said middle wall component and to said lands thereon, thereby forming liquid coolant passages of the channel type, and with the internal surface of said inner wall component functioning as the internal surface of the composite wall and defining the internal combustion gas side surface of said thrust chamber.

2. The composite wall, as set forth in claim 1, wherein said inner wall component is of nickel.

3. The composite wall, as set forth in claim 1, wherein said inner wall component is of copper-silver alloy.

4. The composite wall, as set forth in claim 1, wherein said inner wall component is of molybdenum-rhenium alloy.

* * * * *